Dec. 6, 1932.  D. R. TUDHOPE  1,890,346
ANTISKIDDING DEVICE
Filed Nov. 20, 1929   2 Sheets-Sheet 1

INVENTOR.
David R. Tudhope
BY
ATTORNEYS.

Dec. 6, 1932.     D. R. TUDHOPE     1,890,346
ANTISKIDDING DEVICE
Filed Nov. 20, 1929     2 Sheets-Sheet 2

INVENTOR.
David R. Tudhope
BY
ATTORNEYS.

Patented Dec. 6, 1932

1,890,346

UNITED STATES PATENT OFFICE

DAVID R. TUDHOPE, OF NORTH HERO, VERMONT

ANTISKIDDING DEVICE

Application filed November 20, 1929. Serial No. 408,623.

The present invention relates to an antiskidding device for automobile tires, and has for an object to practically eliminate the great hazard of skidding and slipping on slippery roadways occasioned by ice, snow, mud, slime and the like.

Another object is to provide an anti-skid attachment constructed for application to balloon tires so as not to restrict the free flexing of the same, and to obtain the benefit of the full width of the tread of the balloon tire, and at the same time to provide relatively rigid cross tread members for supporting calks or spurs adapted to engage in the ice, mud or the like.

A further object of the invention is to provide an anti-skidding device with a plurality of rigid cross members and a flexible connecting band for holding the cross members in definite spaced apart relation and from creeping and chafing the tire; the band also maintaining the structure from entanglement when removed from the tire and stored away, so that the device may be quickly and easily applied for use.

With the foregoing and other objects in view, the invention will be more fully described hereinafter, and will be more particularly pointed out in the claim appended hereto.

In the drawings, wherein like symbols refer to like or corresponding parts throughout the several views.

Figure 1:
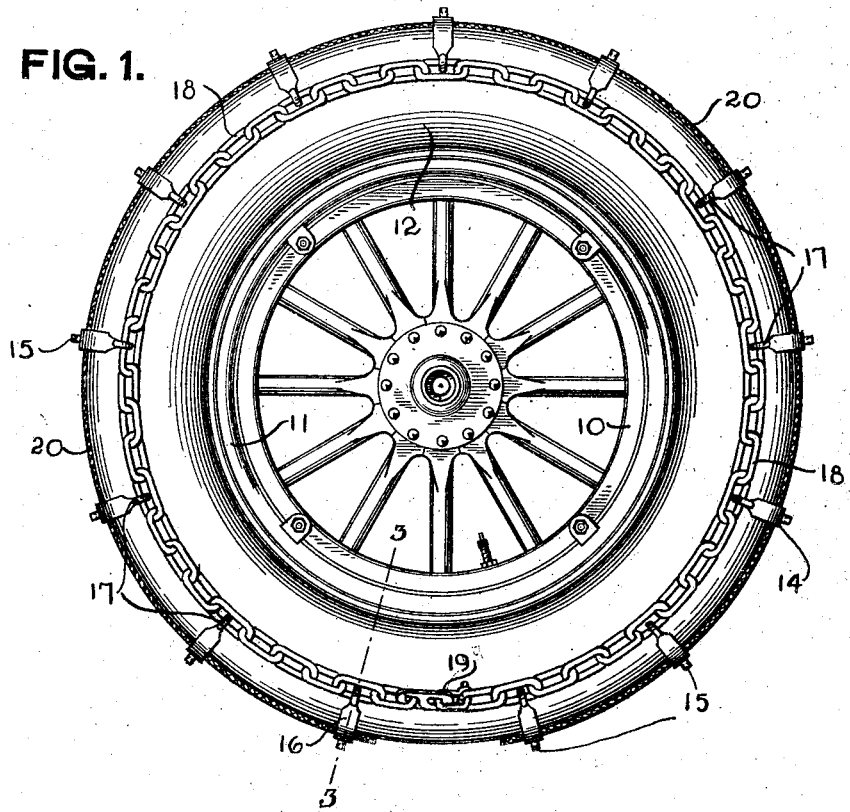
Figure 1 is a side elevation of a tire mounted on a wheel and provided with an antiskidding device constructed according to the present invention.
Figure 2:
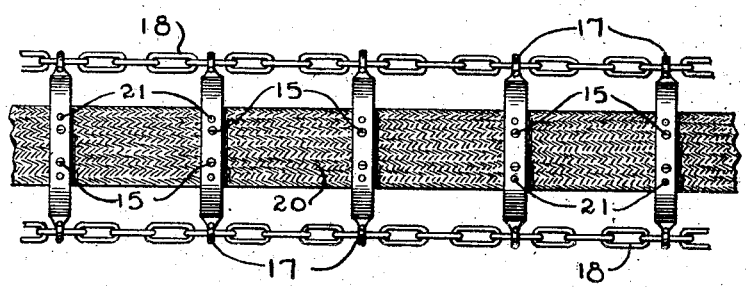
Figure 2 is a detail outer side plan view of a portion of the anti-skidding device.
Figure 3:
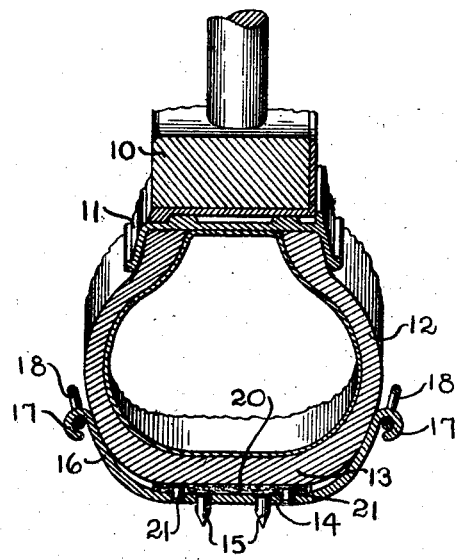
Figure 3 is an enlarged transverse section taken on the line 3—3 of Figure 1 showing the device mounted on the tire and its relation to the wheel and the tire.
Figure 4:
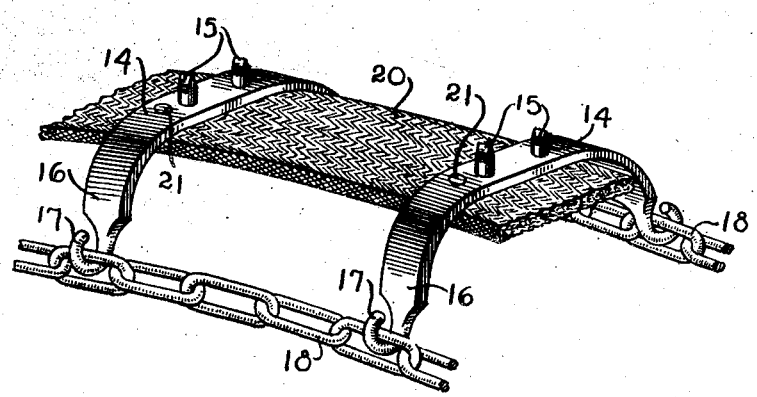
Figure 4 is a fragmentary enlarged perspective view of a portion of the anti-skidding device.

Referring now to the drawings, and first to Figures 1 and 3, 10 designates the felly of a wheel which is equipped with a demountable rim 11 of any approved construction. The rim 11 is shown as equipped with a conventional form of balloon tire 12 having relatively flexible side walls and a relatively broad flat tread portion 13.

The anti-skidding device of the present invention comprises a plurality of spaced apart cross members 14. Each member 14 is preferably constructed of metal, is relatively rigid, and at its intermediate portion is relatively long and flat so as to conform generally to the exterior configuration of the tread portion 13 of the tire, particularly when engaging the roadway and supporting a weight. The cross member 14 is provided in its tread portion with outstanding calks or spurs 15 which are welded, riveted or otherwise suitably secured to the cross member 14 so as to stand out therefrom and have a rigid connection therewith.

Each cross member 14 is provided with inturned or curved ends 16 which follow the general curvature of the side walls 12 of the tire, but which extend inwardly only a relatively short distance with respect to the depth of the tire. The end portions 16 each terminate in an outwardly returned or rolled over hook 17 adapted for detachable engagement in an adjacent link of a side chain 18. The hooks 17 may be closed sufficiently to prevent the accidental detachment of the side chains 18 therefrom when the device is removed from the tire and stored in the tool compartment or other suitable enclosure on the vehicle.

The side chains 18 are adapted to lie at opposite sides of the tire 12 and may be of any suitable construction and preferably of the continuously connected link type having a quick engaging and releasing hook 19 incorporated therein for facilitating the quick and easy application and removal of the device with respect to the tire.

The anti-skidding device is also provided with a tread band 20 which is flexible and preferably constructed of canvas, rubber, or some suitable composition. The tread band 20 is adapted to lie flat upon the exterior surface of the tread portion 13 of the tire and to extend substantially entirely around the tire and admit of the free flexing and movement of the tread portion during the operation of the tire. The cross members 14 are secured, by rivets 21 or the like, at suitable spaced intervals throughout the length of the tread band 20 so as to hold the cross members 14 in properly spaced apart relation and prevent the canting of the members, the sliding of the members toward and from one another, and the rubbing or chafing of the members against the exterior surface of the tire.

The tread band 20 also serves the purpose of protecting the tread portion 13 of the tire from contact with the tread portion of the cross members 14 and holds the cross members from twisting or turning out of their transverse positions across the treads of the tire.

The tread band 20 is given sufficient thickness for spacing the tread portions of the cross members 14 outwardly from the tread portion 13 of the tire so as to insure a firm gripping of the opposite edge portions of the cross members 14 in the ice, snow, mud or the like.

The tread band 20 has still another and very important function in the construction. This latter function is in effectively holding the anti-skidding device structure from becoming entangled when it is stored away and in holding the parts in such condition that they are always ready for quick application to the tire and to prevent the side chains 18 from twisting or turning when the device is being adjusted to the tire. The tread band 20 is capable of being folded or overturned so that the device may be folded over or rolled so as to occupy but relatively small space. When it is desired to apply the device to a tire, it is only necessary to unfold or unroll the device when it is in position to be directly applied over the tread portion 13 of the tire. The flat tread band 20 holds the device in spread position and with the cross members 14 spaced apart and in substantially parallel relation throughout the length of the device.

The device is now applied to the tire with the tread band 20 against the tread portion 13 of the tire and with the side chains 18 at the opposite sides of the tire.

The hooks or clasps 19 are now fastened so as to hold the device firmly in place upon the tire. The cross members 14 are held by the tread strip 20 from any appreciable movement excepting inward movement incident to the compression of the tread portion of the tire when the latter reaches the roadway as shown in Figure 3. The tread strips 14 are also held against tilting or rocking movement as they are secured to the tread strip or band 20 by the rivets 21.

It is obvious that various changes and modifications may be made in the details of construction and design of the above specifically described embodiment of this invention without departing from the spirit thereof, such changes and modifications being restricted only by the scope of the following claim.

What is claimed is:

An anti-skidding device for tires, comprising a relatively thick, flat flexible tread strip adapted to extend about the periphery of a tire and lie against the same, a plurality of relatively narrow tread members each having a flattened portion secured across the outer surface of the tread strip at spaced intervals and having end portions extending at either side of the strip and curved towards the sides of the tire, providing spaces between the end portions and the side of the tire for expansion of the tire into said spaces, and side chains connected to the extremities of the cross members to hold the latter and the strip to the tire.

DAVID R. TUDHOPE.